March 21, 1967     J. E. BIRTH     3,310,775
VEHICLE BURGLAR ALARM
Filed Feb. 24, 1965
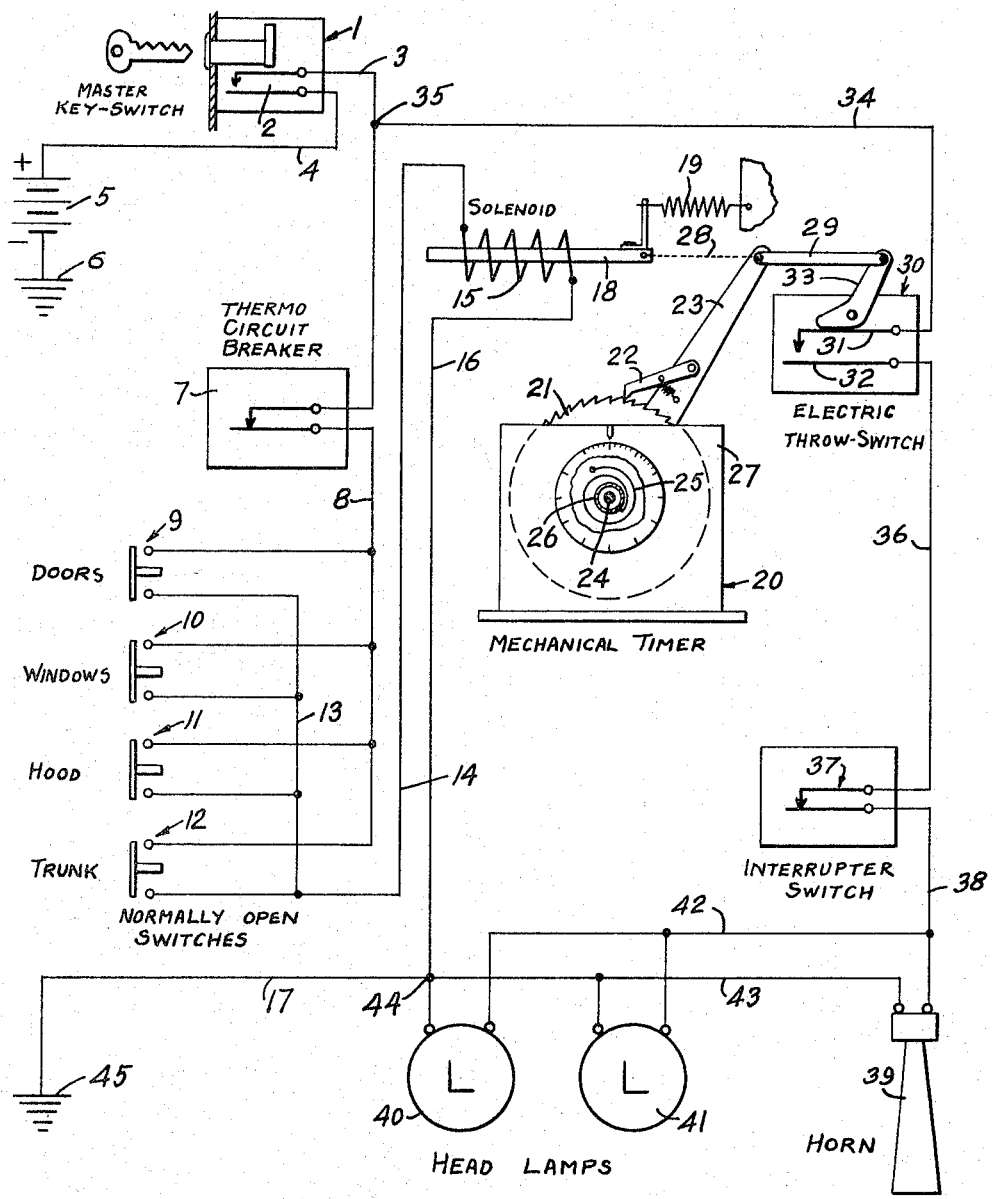
INVENTOR,
JAMES E. BIRTH;
BY
ATTORNEY

United States Patent Office 3,310,775
Patented Mar. 21, 1967

3,310,775
VEHICLE BURGLAR ALARM
James E. Birth, 1428 W. 47th St.,
Los Angeles, Calif. 90062
Filed Feb. 24, 1965, Ser. No. 434,900
8 Claims. (Cl. 340—63)

ABSTRACT OF THE DISCLOSURE

A vehicle burglar alarm having two electrical circuits, one a setting circuit having a master key switch for placing the setting circuit in condition for operation, and an alarm circuit which is brought into operation as a result of tampering with the vehicle and which will operate for a period of time independent of the setting circuit.

---

The present invention relates to a vehicle burglar alarm of compact construction and of few parts which effectively gives a warning either audible or visible or both, when the vehicle is tampered with by an unauthorized person. The tampering may be of the nature of forcing one of the doors open or by lifting the hood in an attempt to electrically bridge the ignition system, access to the trunk compartment or storage compartment at the rear of the vehicle, by way of examples.

So far as the inventor is aware, prior burglar alarm systems for vehicles have depended for operation upon electrical circuits which connect with the vehicle ignition system, lights, and other factory wired components.

An object of my invention is to provide a vehicle burglar alarm which is independent of the ignition system and does not tie into the lighting circuits or horn circuit but is independent of such circuits.

A further object is the provision of a vehicle burglar alarm which acts intermittently rather than continuously when the vehicle is tampered with by an unauthorized person. The inventor has found that a continuous sound from a horn or other audible signal does not attract the attention of others as effectively as an intermittent sound.

Another object is the provision of a vehicle burglar alarm which will operate in any position and is not sensitive to vibration.

A further object is the provision of a vehicle burglar alarm of such nature that it is easily installed in the vehicle within trunk space or in a position in the vehicle which does not provide ready access thereto by an unauthorized person.

Vehicle burglar alarm systems known to the inventor tie into the factory installed wiring or mounted switches which may have been designed to carry a small current. Current overload may cause damage to the circuit or the blowing of fuses which would leave the vehicle unprotected. My invention is so designed that these difficulties cannot occur and the alarm system always will function.

With the above mentioned and other objects in view, including inexpensiveness of construction, foolproofness in operation, and general superiority of the burglar alarm system, the invention consists in the novel and useful provision, formation, construction, association and relative arrangement of parts, members and features, all as shown in the accompanying drawing, described generally, and more particularly pointed out in the claims.

In the drawing:

The figure is a wiring diagram illustrating the various elements of the burglar alarm system.

Referring now to the drawing, I provide as a first essential a master key switch indicated at 1 and which switch is of a character now available on the market and adapted to be key operated for operating switch 2. In its simplest form switch 2 has a pole and a contact to which conductors 3 and 4 are connected. The conductor 4 is connected to the positive terminal of battery 5 and the negative battery terminal is grounded at 6. As is usual, the ground is to the vehicle frame and body. Conductor 3 leads to a thermo time delay or circuit breaker switch designated generally as 7 and from said switch 7 a further conductor 8 connects in series parallel to one contact of a door switch 9, a window switch 10, a hood switch 11, and trunk switch 12 as well as with additional switches as may be desirable or necessary for the vehicle to be protected. The second contacts for each switch are connected in parallel to common conductor 13 which in turn joins conductor 14. The switches 9 to 12 inclusive are of the type generally employed for door switches and are normally open when a door, window, hood or trunk is closed but are closed when the door, window, hood and trunk are opened. This type of switch is readily available on the market and provides a spring pressed contact arm which bridges the switch contacts when the door is opened and breaks said contacts when the door is closed. The conductor 14 is in circuit with one end of a solenoid coil 15 and the solenoid coil in turn has conductor 16 connected to its opposite end and to conductor 17 which is grounded. The plunger 18 of the solenoid has a spring return 19 whereby when the solenoid is energized the plunger will be moved inwardly and when de-energized the coil spring 19 will move the same outwardly from the solenoid coil. Spring 19 is connected to one end of the plunger by a bracket while the opposite end of the spring is secured to a suitable casing for the vehicle alarm.

A mechanical timer is provided at 20 which may consist in its simplest embodiment in ratchet wheel 21 and a spring pressed detent 22 for engagement with the ratchet teeth which detent is pivoted to an arm 23. The ratchet wheel is mounted upon a shaft 24 which shaft is surrounded by a spiral leaf spring 25, the outer end of the spring is connected to the ratchet wheel while the inner end thereof is fixed to fixed tube 26 surrounding the shaft, the entirety being mounted in a suitable casing or boxing 27. A dial and pointer may be provided on the box or container. The arm 23 at its outer end is connected by means of a chain 28 to the outer end of the plunger 18. Thus when the solenoid is energized to draw the plunger 18 inwardly of the coil 15 the detent 22 by its engagement with a ratchet tooth will revolve the ratchet wheel and wind the leaf spring 25 and when the circuit is broken to the solenoid coil, the spring 19 will move the plunger outwardly from the coil 15 while the leaf spring 25 starts to unwind for a given time period. The arm 23 is in linked connection at 29 with switch 30 of the snap action type. The switch 30 may be of a toggle type which incorporates a spring or springs for actuating movable contacts to release the same and make a quick break. I do not contemplate any particular form of snap action switch save and except that the movable contact with relation to a stationary contact is made or broken by snap action. Hence, in the switch 30 the movable switch contact arm is shown at 31 and the fixed contact arm by 32 with the snap action mechanism at 33, which mechanism as shown is connected with the link 29. Therefore, the movable contact is closed to the fixed contact when the solenoid plunger 18 is drawn inwardly, which movement rotates arm 23 to set the mechanical timer to the end that the mechanical timer will go through its cycle of movement before actuating the snap action switch 30 after the circuit to the solenoid 15 is broken. A conductor 34 connects with conductor 3 at 35 and leads to the movable switch contact 31. The fixed contact 32 through a conductor 36 is in series with an interrupter switch 37 of the blinker type such as used in turn signals for automobiles. A conductor 38 connects the interrupter switch 37 to an electric horn 39. The vehicle headlights at 40 and 41 are in circuit with the conductor 38 and with the horn circuit by means of conductors 42 and 43. The conductor 43 is connected to the conductors 16 and 17 at 44 and conductor 17 leads to a ground at 45, this ground being the vehicle frame or body, or both.

It is to be noted from the description so far given that there are two independent circuits, the first circuit which I term the setting circuit is through the master key switch 1, the thermo type circuit breaker 7 and switches at the ports of access to the vehicle such as the doors, windows, hood and trunk. An opening of any switch at a port of entry as shown at 9 to 12 inclusive when the master switch is closed energizes the solenoid circuit 15 through conductors 14, 16 and 17 to ground 45. Energizing the coil 15 then causes a second circuit termed the alarm circuit to function and which includes the mechanical timer 20, snap action switch 30, interrupter switch 37 and alarms 39, 40, and 41.

The operation, uses and advantages of my invention are as follows.

Assuming that all of ports of vehicle entry are closed such as the doors, hood and rear deck, the operator inserts a master key into the key switch 1 and turns the mechanism to close switch 2. A closing of switch 2 completes the circuit to the thermo time delay switch and circuits to the switches 9 to 12 inclusive for the doors, windows, hood and trunk. If switches 9 to 12 inclusive are all open, no circuit is completed and hence the thermo time switch which is normally closed, is not in any manner heated so as to cause an opening thereof. The circuit from the different switches through conductor 14 leads to the solenoid coil 15 and returns through conductor 16 to conductor 17 which is grounded. Hence, no current flows to energize the solenoid coil 15 nor operate the thermo time delay switch. However, if a door should be forced open, the switch at 9 would be closed whereupon current flows from the battery 5 through the conductors 8, 13, and 14, to the coil 15, conductors 16 and 17, to grounds 6 and 45 causing actuation of the plunger 18 to in turn set the mechanical timer by the detent 22 engaging a tooth 21 of the ratchet wheel to place the spring 25 in tension. As long as the solenoid plunger 18 remains within the coil and is not allowed to retract under tension of a spring 19, the snap action switch 30 will remain closed and consequently hold the movable and fixed contacts 31 and 32 in engagement, the blinker 37 in operation and the horn 39 and lights 40 and 41 energized. If the unauthorized intruder should close the door, the switch at 9 would be opened which would break the circuit to the solenoid coil 15 however, this would not effect operation of the horn 39 and the lights 40 and 41 because they are in an independent circuit and controlled by action of the mechanical timer to open the snap action switch 30 after a given duration of time as set by the mechanical timer. After the mechanical timer has moved to open the snap action switch 30, the circuit is broken through the interrupter switch 37 and the horn and lights ceases to operate. To prevent continuous operation of the solenoid, the thermo time delay switch will operate after a given time period to open the circuit through the solenoid coil 15 regardless of whether or not the door switch is left closed. If the door is left open and not closed, the door switch at 9 is, of course, closed, and the thermo time delay switch, after a given time period for cooling will again move to close the switch at 7 whereupon the solenoid circuit through coil 15 is again completed which will actuate the mechanical timer to in turn actuate the snap action switch 30 and close the same with resulting actuation of the audible and visible signals 39, 40, and 41. It will be seen that I have provided an intermittent alarm circuit which, whether a door is left open or closed, will continue to operate the alarm intermittently until the master key switch is operated to open the switch.

My circuit and the parts utilized are saving in the battery current due to the fact that the current is not used continuously and affords a means for operating visual and audible signals in such a manner as to attract the attention of others to the vehicle being tampered with by an unauthorized person.

From the description so far given, it is evident that I have two circuits, one a setting circuit which includes the master key switch and places the setting circuit in condition for operation when an unauthorized person attempts entry to the vehicle and an alarm circuit which is brought into operation as a result of tampering and which will operate for a period of time independent of the setting circuit, as both the setting and the alarm circuits have independent hot leads.

As a summary: when the master key switch is closed and one of the port of entry switches is likewise closed, the solenoid is energized to draw the plunger within the confines of the solenoid coil. The thermo circuit breaker normally is closed for a duration of time until sufficiently heated to break the circuit to the solenoid coil. Movement of the plunger in the solenoid coil immediately sets the cycle of movement for the mechanical timer to close the snap action switch and the mechanical timer does not allow the snap action switch to open until the circuit is opened by the thermo circuit breaker or the closed switch at the port of entry is opened whereupon the mechanical timer is released for movement for a period of time to cause the snap action switch to break the circuit which is in series with the master key switch, battery and the visual and audible signals. The duration of time of operation of the thermo type circuit breaker from closed to open condition is approximately three minutes while the mechanical timer operates for a longer period of say five minutes before the snap action switch is thrown from a closed to an off position. This time differential between the thermo type circuit breaker and the mechanical timer is sufficient to allow the thermo type circuit breaker to partially recover by cooling and to again cause functioning of the setting circuit under the conditions stated.

I claim:

1. A burglar alarm for vehicles, including: a battery, a master key switch in series connection with a terminal of said battery, a thermo circuit breaker in series connection with the master key switch and a normally open switch at a port of entry to said vehicle, a solenoid having a coil winding in series connection with the port of entry switch and in series connection with the other terminal of the battery; a mechanical timer and an electric throw switch operated by the mechanical timer to close the switch when the solenoid coil is energized, said electric throw switch being connected in series through said master key switch with the battery; an interrupter switch in series connection with the electric throw switch, and audible and visual electric signals connected in parallel circuit with each other and in series circuit with the interrupter switch and with the battery.

2. The device as set forth in claim 1: said mechanical timer being set for movement by the solenoid, said solenoid having a plunger and a spring for returning the plunger to a starting position when the solenoid coil is not energized to release the mechanical timer for movement.

3. The device as set forth in claim 1: said thermo circuit breaker being initially closed when the switch at the vehicle port of entry is first closed by unauthorized entry and opening the circuit after a pre-determined time period while the switch at the vehicle port of entry remains closed to open the circuit to the solenoid coil.

4. The device as set forth in claim 3: said mechanical timer maintaining the electric throw switch closed for a selected time period after opening the circuit to the solenoid coil.

5. The device as set forth in claim 1: said interrupter switch being of the blinker type to cause intermittent audible and visual alarms.

6. The device as set forth in claim 4: the closed cycle for the thermo breaker switch being so timed that the cycle is of shorter duration than the opening cycle of the mechanical timer controlled electric throw switch.

7. A burglar alarm for vehicles, including: an electrical setting circuit and an electrical alarm circuit; said electrical setting circuit comprising: a master key switch, a battery, one terminal of which is in series connection with the master key switch, the other battery terminal being grounded, a thermo circuit breaker in series connection with the master key switch, a normally open switch at the vehicle port of entry, one contact of the switch at said vehicle port of entry being in series connection with the thermo circuit breaker, a solenoid having a coil and plunger, the coil being in series connection with the switch at the vehicle port of entry, the solenoid coil being grounded, whereby when the master key switch is closed current flows through the thermo circuit breaker, the port of entry switch when closed, and the solenoid coil to battery to move the solenoid plunger in one direction; said alarm circuit comprising a mechanical timer set as to movement when the plunger is moved in one direction within the solenoid coil, and an electric throw switch adapted to be closed by the setting of the mechanical timer, said electric throw switch being in series connection with the master key switch and likewise in series parallel connection with audible and visual alarms and a ground connection whereby current flowing through the thermo circuit breaker, the switch at the vehicle port of entry being closed, will, after a time period, open the electrical circuit to the solenoid coil to permit the plunger to move outwardly from the solenoid coil, and the mechanical timer after a time delay, opening the electric throw switch and thereby opening the circuit to the visual and audible alarms.

8. The device as set forth in claim 7, and an interrupter switch in series connection with the audible and visual alarms and the electrical throw switch to cause intermittent action of both alarms when electric current is flowing thereto.

No references cited.

NEIL C. READ, *Primary Examiner.*

A. H. WARING, *Assistant Examiner.*